(12) United States Patent
Takamoto et al.

(10) Patent No.: US 6,454,417 B1
(45) Date of Patent: Sep. 24, 2002

(54) PROJECTION OPTICAL SYSTEM COMPRISING AN OPTICAL FUNCTION SURFACE FOR REFLECTING OR TRANSMITTING LIGHT FROM A SPATIAL LIGHT MODULATOR

(75) Inventors: Katsuhiro Takamoto; Shigeru Sawamura, both of Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/517,236

(22) Filed: Mar. 2, 2000

(30) Foreign Application Priority Data

Mar. 5, 1999 (JP) .......................................... 11-057982

(51) Int. Cl.$^7$ ........................ G03B 21/00; G03B 21/28; G02F 1/00
(52) U.S. Cl. ............................. 353/33; 353/81; 353/99; 348/771
(58) Field of Search .............................. 353/98, 99, 81, 353/82, 39, 33, 34, 20, 37, 31; 348/742, 743, 771; 345/31; 349/8, 5, 9, 62; 359/634, 637, 639, 640, 833, 834, 837

(56) References Cited

U.S. PATENT DOCUMENTS

| | | | |
|---|---|---|---|
| 4,857,997 A | * | 8/1989 | Fukami et al. ................. 358/55 |
| 5,548,443 A | * | 8/1996 | Huang ........................... 359/638 |
| 5,612,753 A | | 3/1997 | Poradish et al. ............. 348/743 |
| 5,633,755 A | | 5/1997 | Manabe et al. .............. 359/443 |
| 5,868,480 A | | 2/1999 | Zeinali ......................... 353/31 |
| 5,905,545 A | | 5/1999 | Poradish et al. ............. 348/743 |
| 6,179,424 B1 | * | 1/2001 | Sawamura ..................... 353/33 |
| 6,250,763 B1 | * | 6/2001 | Fielding et al. ............... 353/31 |
| 6,357,878 B1 | * | 3/2002 | Sawamura ..................... 353/33 |
| 6,382,799 B1 | * | 5/2002 | Nishikawa et al. .......... 353/122 |

FOREIGN PATENT DOCUMENTS

| | | | |
|---|---|---|---|
| JP | 9-96867 | 4/1997 | |
| JP | 9-98442 | 4/1997 | |
| JP | 11-249037 | 9/1999 | ........... G02B/26/08 |
| JP | 2000-010045 | 1/2000 | ........... G02B/27/18 |

* cited by examiner

*Primary Examiner*—Russell Adams
*Assistant Examiner*—Melissa J. Koval
(74) *Attorney, Agent, or Firm*—Sidley Austin Brown & Wood LLP (57) ABSTRACT

In a projector optical system provided with a DMD having minute mirror devices regularly arranged on one plane so as to correspond to the pixels of an image and selectively reflecting illuminating light in the direction of the optical axis of a projection optical system or in a direction different from the direction of the optical axis by bringing the mirror devices into an ON state or an OFF state according to the input video signals, and a prism disposed between the DMD and the projection optical system and having a first surface reflecting the illuminating light to be directed to the DMD and transmitting the light reflected at the DMD, the prism has a second surface transmitting, of the light transmitted by the first surface, light reflected at the mirror devices in the ON state and reflecting light reflected at the mirror devices in the OFF state.

13 Claims, 6 Drawing Sheets

PROJECTION OPTICAL SYSTEM COMPRISING AN OPTICAL FUNCTION SURFACE FOR REFLECTING OR TRANSMITTING LIGHT FROM A SPATIAL LIGHT MODULATOR

This application is based on application No. H11-057982 filed in Japan on Mar. 5, 1999, the entire content of which is hereby incorporated by reference.

BACKGROUND OF THE INVENTION

1. Field of the Invention

The present invention relates to a projector optical system, and more particularly, to a projector optical system provided with a Digital Micromirror Device™ (DMD™, manufactured by Texas Instruments Incorporated. Hereinafter, referred to simply as digital mirror device or DMD) having a multiplicity of variable light reflection angle mirror devices capable of reflecting only signal light in the direction of the projection optical system by changing the angle of reflection of the emitted light according to video signals.

2. Description of the Prior Art

In recent years, with increasing demands for higher-definition images, development of a technology to greatly increase the number of pixels without increasing the size of the optical system has been required in the field of the projector. In view of this requirement, a projector using a DMD has been developed.

In the DMD, minute rectangular mirror devices of high reflectance capable of changing the angles of rotation according to video signals are formed on a silicon memory chip by use of a semiconductor technology. The projector using the DMD controls the direction of reflection of the illuminating light by changing the angles of rotation of the mirror devices and converges only desired reflected light on the screen, thereby enabling projection of a desired image.

Figure 7A:
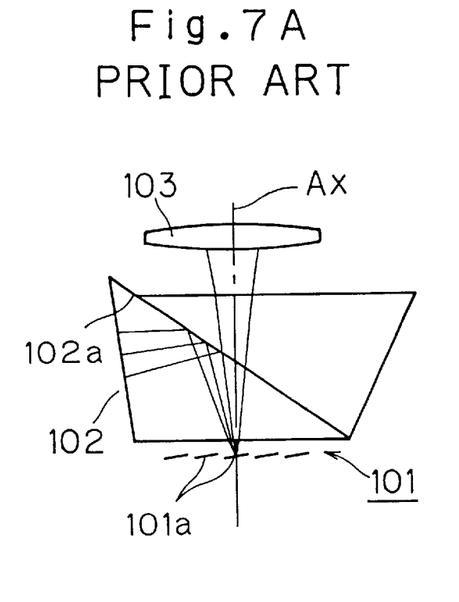
FIGS. 7A is a view of a conventional projector optical system when a DMD thereof is in an ON state.
Figure 7B:
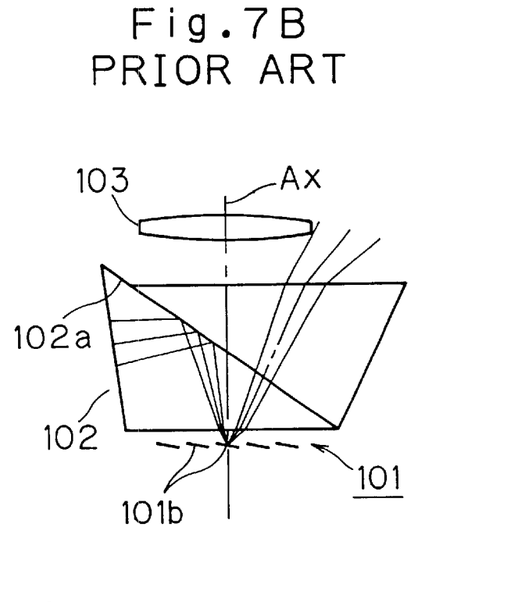
FIGS. 7B is a view of the conventional projector optical system when the DMD is in an OFF state.

FIGS. 7A and 7B show the principle of the DMD in the projector optical system. The manner of travel of light when the mirror devices of a DMD 101 are in an ON state is shown in FIG. 7A. The manner of travel of light when the mirror devices are in an OFF state is shown in FIG. 7B. As shown in FIG. 7A, the illuminating light incident, through an input/output separating prism system 102, on devices 101a of the DMD 101 which are in the ON state is reflected substantially in the direction of the optical axis Ax of a projection optical system 103 (hereinafter, this reflected light will be referred to as ON light). The ON light is projected onto the screen by the projection optical system 103. The optical path of the light directed to the projection optical system 103 to be projected onto the screen will hereinafter be referred to as effective optical path.

The input/output separating prism system 102 separates the input/output light by using the difference in angle of incidence on a surface 102a, that is, the illuminating light is reflected by the surface 102a and directed the DMD 101, and the light reflected from the DMD 101 is transmitted by the surface 102a.

The illuminating light incident on devices 101b in the OFF state having a different angle of rotation from the devices 101a in the ON state is reflected in a different direction from the ON light as shown in FIG. 7B (hereinafter, this light will be referred to as OFF light).

However, in the conventional projector optical system, there are cases where the OFF light as shown in FIG. 7B is incident on the projection optical system. Such light follows the effective optical path to form an image (ghost) different from the image that should be formed on the screen or to decrease the contrast of the projection screen.

Figure 8:
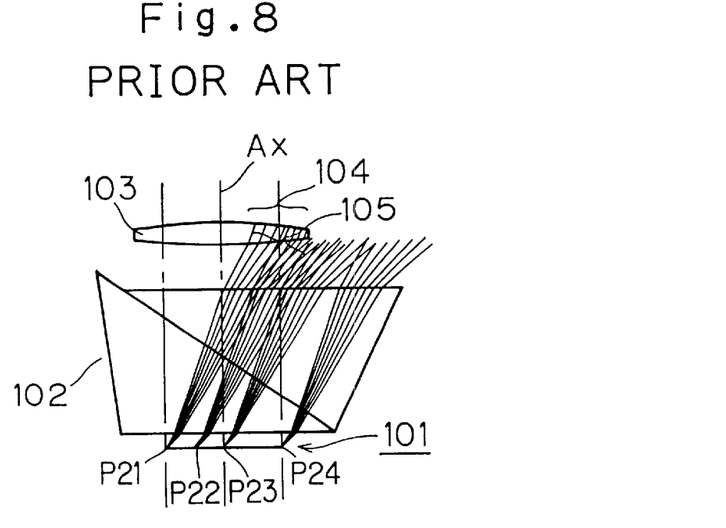
FIG. 8 shows optical paths in the conventional projector optical system.

FIG. 8 shows an example in which the OFF light is incident on the projection optical system. The manner of travel of the OFF light from positions P21, P22, P23 and P24 of the DMD 101 is shown in FIG. 8. The projection optical system 103 is disposed so that the ON light from the mirror devices is incident thereon. However, the OFF light ray 105 from the position P21 on the left and the ON light ray 104 from the position P24 on the right are not completely separated at the position of the projection optical system 103, so that the projection optical system 103 taking in the ON light ray 104 simultaneously takes in the OFF light ray 105.

Figure 9:
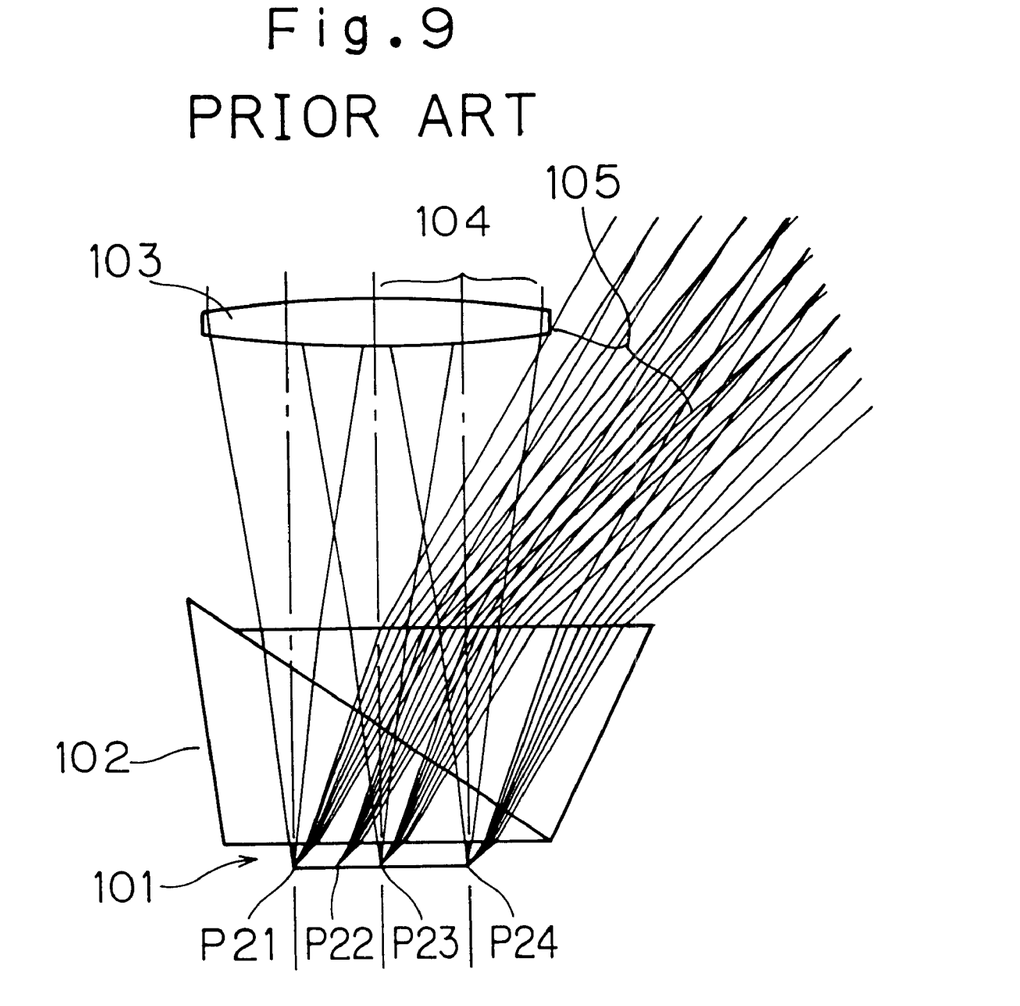
FIG. 9 shows optical paths in another conventional projector optical system.

FIG. 9 shows a conventional example different from that shown in FIG. 8. In this example, to solve the problem of the optical system of FIG. 8, the distance between the projection optical system 103 and the DMD 101 is set longer. In this optical system, since the OFF light ray 105 from the position P21 and the ON light ray 104 from the position P24 are completely separated at the position of the projection optical system 103, the OFF light is never incident on the projection optical system 103. However, such a structure results in an increase in the size of the optical system.

SUMMARY OF THE INVENTION

An object of the present invention is to provide a projector optical system that is small and capable of producing high-contrast and ghost-free projection images.

To achieve the above-mentioned object, according to one aspect of the present invention, an optical apparatus is provided with: a reflective type spatial light modulator for separating incident light by reflecting it in a first direction and a second direction different from each other; an optical function surface reflecting a reflected light ray in the first direction and transmitting a reflected light ray in the second direction; and an optical system on which one of the reflected light rays in the first and the second directions exiting from the optical function surface is incident.

According to another aspect of the present invention, a projector is provided with: a light source; an illuminating optical system from which light from the light source exits as illuminating light; a reflective type spatial light modulator for reflecting the illuminating light from the illuminating optical system and separating it into ON light and OFF light that are reflected in directions different from each other; a prism having an optical function surface transmitting one of the ON light and the OFF light reflected from the modulator and reflecting the other one of the ON light and the OFF light; and a projection optical system for projecting the ON light exiting from the optical function surface.

BRIEF DESCRIPTION OF THE DRAWINGS

This and other objects and features of this invention will become clear from the following description, taken in conjunction with the preferred embodiments with reference to the accompanying drawings in which.

DESCRIPTION OF THE PREFERRED EMBODIMENTS

Figure 1:
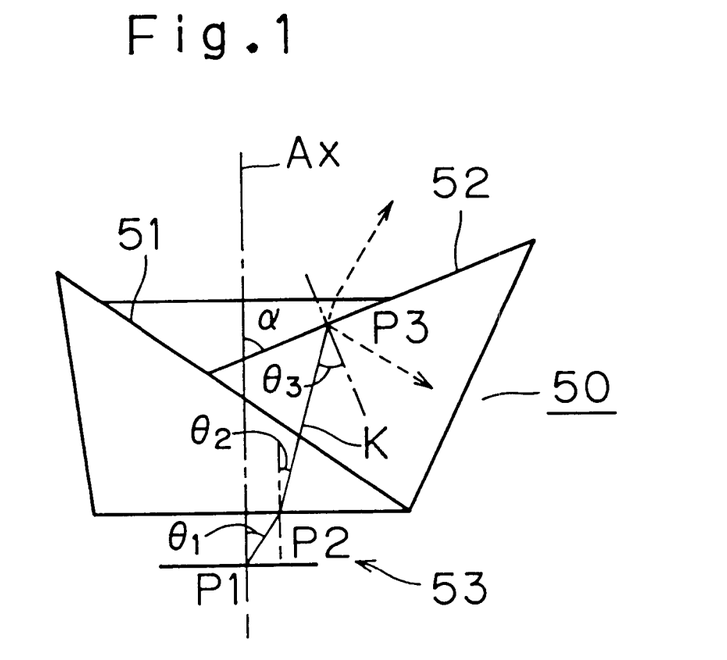
FIG. 1 is a cross-sectional view showing an example of the structure of a prism of the present invention.

FIG. 1 is a cross-sectional view showing an example of the structure of a prism used in the projector optical system of the present invention. In a prism 50, reference numeral 51 represents a first surface, and reference numeral 52 represents a second surface. The first and the second surfaces 51 and 52 reflect or transmit light according to the angle of incidence because they are in contact with a thin air layer. Reference numeral 53 represents a mirror surface of a DMD.

It is assumed that in an optical system as shown in FIG. 1, a light ray K is present that is reflected at a position P1 of the DMD, is incident on the prism 50 at a position P2, and is reflected or transmitted at a position P3 of the second surface 52. The angle of exit of the light ray K at the position P1 is $\theta_1$, the angle of incidence on the prism 50 at the position P2 is $\theta_2$, and the angle of incidence on the second surface at the position P3 is $\theta_3$. The refractive index of the prism 50 to the extraordinary ray is $n_e$. Now, letting the angle of the second surface with respect to the optical axis Ax of the projection optical system be $\alpha$, a condition of $\alpha$ such that light reflected from the DMD in a first direction is transmitted and light reflected in a second direction is reflected is calculated.

When the light ray K is totally reflected at the second surface 52, the following expression holds:

$$n_e \sin \theta_3 \leq 1 \quad (1)$$

From a relationship that the sum of the interior angles of a triangle is $\pi$, the following expression holds:

$$\theta_3 = \pi/2 + \theta_2 - \alpha \quad (2)$$

Substituting the expression (2) into the expression (1), the following expression is obtained:

$$\sin(\pi/2 + \theta_2 - \alpha) \geq 1/n_e$$

$$\pi/2 + \theta_2 - \alpha \geq \sin^{-1}(1/n_e)$$

$$\alpha \leq \pi/2 - \sin^{-1}(1/n_e) + \theta_2 \quad (3)$$

The light ray K fulfilling the expression (3) is totally reflected at the second surface 52. Since the expression (3) is a condition for a light ray to be totally reflected, a condition for a light ray to be transmitted is as follows:

$$\alpha > \pi/2 - \sin^{-1}(1/n_e) + \theta_2 \quad (4)$$

The light ray K fulfilling the expression (4) is transmitted by the second surface 52.

Figure 2:
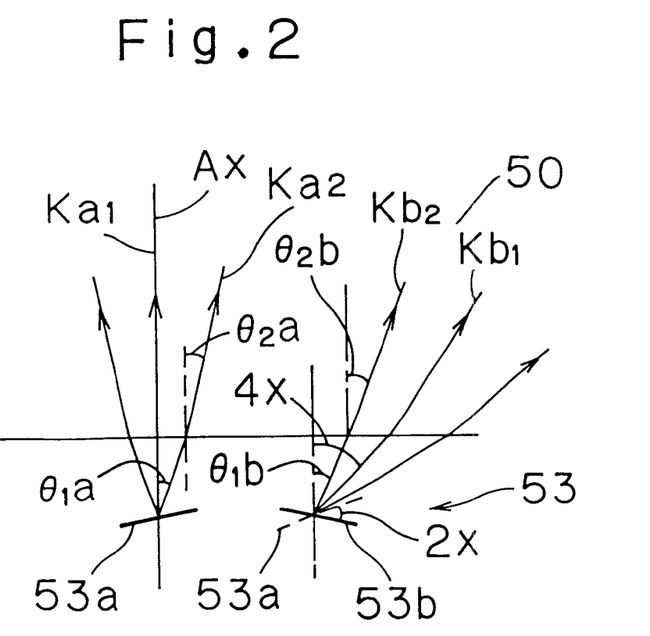
FIG. 2 shows optical paths of the reflected light from a DMD in the vicinity of the prism.

Next, consideration will be given to the light ray K. FIG. 2 schematically shows the optical paths of the light ray K incident on the prism from the DMD. The light is reflected from each mirror device so as to have a predetermined spread with the central light ray as the center. Let the spread be $\pm\theta_{1a}$. Here, $\theta_{1a}$ takes a positive value. Since the light is reflected from a mirror device 53a in the ON state so that its central light ray $K_{a1}$ follows the optical axis Ax, this light spreads within a range of $\pm\theta_{1a}$ with respect to the optical axis Ax.

The light is reflected from a mirror device 53b in the OFF state so that its central light ray $K_{b1}$ is at a predetermined angle with respect to the optical axis, and this light spreads within a range of $\pm\theta_{1a}$ with respect to the central light ray. When the included angle of the reflecting mirror device in the ON state and in the OFF state is 2x (in this case, a state in which the reflecting mirror has a rotation angle of $\pm$x with respect to the mirror surface is the ON state or the OFF state), the inclination of the central light ray $K_{b1}$ of the OFF light with respect to the optical axis Ax is 4x. Therefore, the OFF light is reflected so as to spread within a range of $4x \pm \theta_{1a}$ with respect to the optical axis Ax.

For the second surface, because of its purpose, the inclination thereof is necessarily set so that the ray K of the ON light is entirely transmitted and the ray K of the OFF light is entirely reflected. That is, the inclination is set so that the light ray of the ON light that is closest to the OFF light (the light ray $K_{a2}$ in FIG. 2) is transmitted and the light ray of the OFF light that is closest to the ON light (the light ray $K_{b2}$ in FIG. 2) is reflected. This is because when the light ray of the ON light that is closest to the OFF light is transmitted, the ON light ray is all transmitted, and when the light ray of the OFF light that is closest to the ON light is reflected, the OFF light is all reflected.

In FIG. 2, the angle of reflection of the light ray $K_{a2}$ at the mirror device is $\theta_{1a}$. The angle of incidence of the light ray $K_{a2}$ on the prism 50 is $\theta_{2a}$. The angle of reflection of the light ray $K_{b2}$ at the mirror device is $\theta_{1b}$, and the angle of incidence thereof on the prism 50 is $\theta_{2b}$.

In order for the light ray $K_{a2}$ to be transmitted by the second surface 52, the expression (4) is fulfilled. That is, the following expression obtained by substituting $\theta_{2a}$ for $\theta_2$ in the expression (4) is fulfilled:

$$\alpha > \pi/2 - \sin^{-1}(1/n_e) + \theta_{2a} \quad (4a)$$

In order for the light ray $K_{b2}$ to be reflected at the second surface 52, the expression (3) is fulfilled. That is, the following expression obtained by substituting $\theta_{2b}$ for $\theta_2$ in the expression (3) is fulfilled:

$$\alpha \leq \pi/2 - \sin^{-1}(1/n_e) + \theta_{2b} \quad (3a)$$

Hereinafter, $\theta_{2a}$ and $\theta_{2b}$ of the expressions (4a) and (3a) will be represented by parameters of the optical system.

$\theta_{1a}$ representing the spread of the reflected light depends on the F number of the projection optical system. When the F number of the projection optical system is $F_{No}$, the following relationship holds:

$$\sin\theta_{1a} = 1/(2F_{No}) \quad (5)$$

From the Snell's formula, the following expression holds:

$$\sin\theta_{1a} = n_e \sin \theta_{2a} \quad (6)$$

From the expressions (5) and (6), the following expression is obtained:

$$\theta_{2a} = \sin^{-1}(1/2n_e F_{No}) \quad (7)$$

$\theta_{1b}$ fulfills the following relationship as mentioned above:

$$\theta_{1b} = 4x - \theta_{1a} \quad (8)$$

Substituting the relationship of the expression (5) into the expression (8), the following expression is obtained:

$$\theta_{1b} = 4x - \sin^{-1}(1/2F_{No}) \quad (9)$$

From the Snell's formula, the following expression holds:

$$\sin\theta_{1b} = n_e \sin\theta_{2b} \quad (10)$$

From the expressions (9) and (10), the following expression is obtained:

$$\theta_{2b} = \sin^{-1}[(1/n_e)\sin\{4x - \sin^{-1}(1/2F_{No})\}] \quad (11)$$

Since the inclination α of the second surface with respect to the optical axis fulfills the expressions (4a) and (3a), the ON light is transmitted by the second surface and the OFF light is reflected thereat. $\theta_{2a}$ and $\theta_{2b}$ of the expressions (4a) and (3a) are represented by the expressions (7) and (11), respectively.

<First Embodiment>

Figure 3:
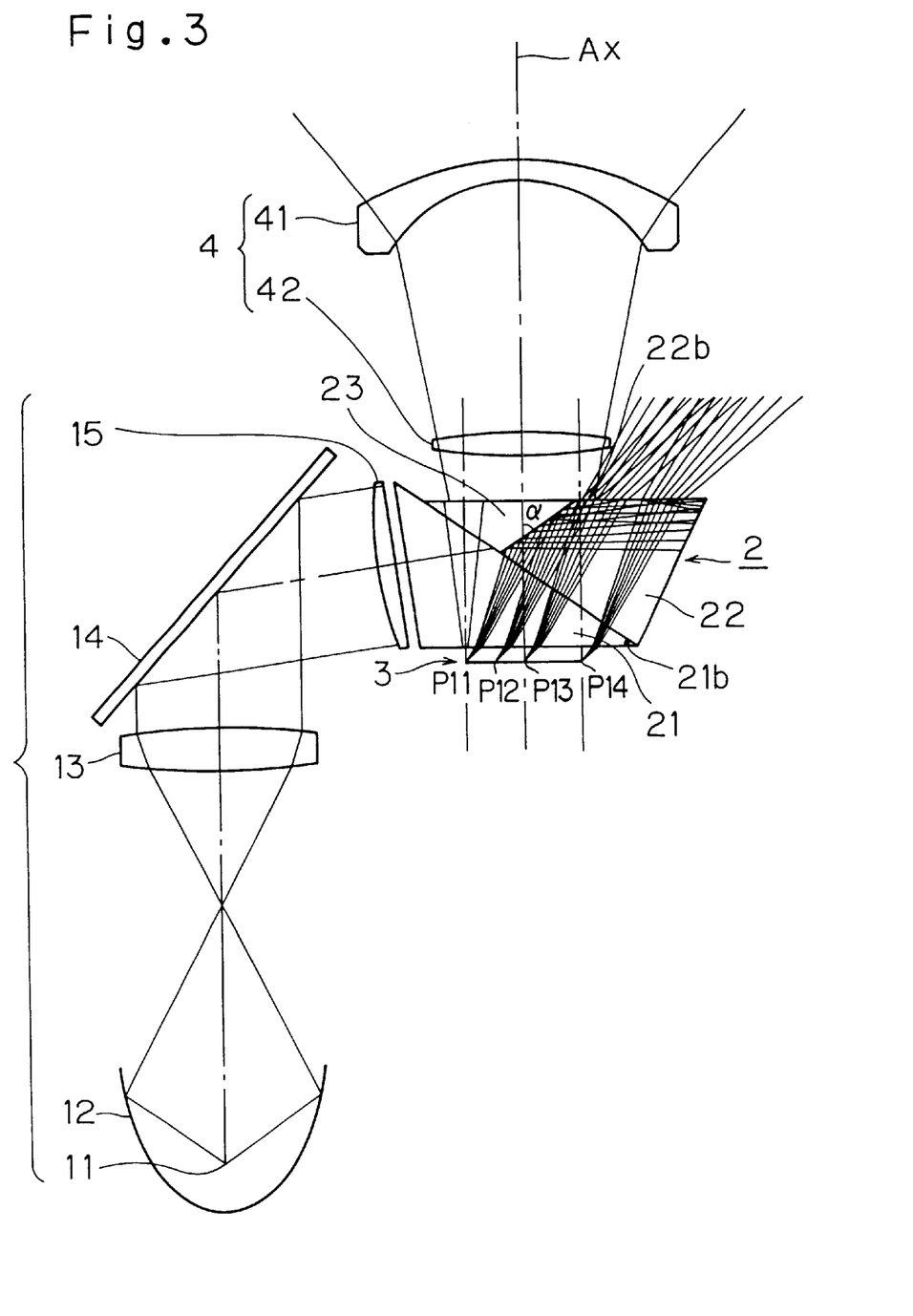
FIG. 3 is a horizontal cross-sectional view of a projector optical system according to a first embodiment.

FIG. 3 is a horizontal cross-sectional view showing a first embodiment of the projector optical system according to the present invention. The projector optical system comprises an illuminating optical system 1, an input/output separating prism system 2, a DMD 3 and a projection optical system 4.

The illuminating optical system 1 comprises a light source 11 emitting white light, a reflector 12 comprising an ellipsoidal mirror, a parallel conversion lens 13, a mirror 14, and a condenser lens 15. In the illuminating optical system 1, light from the light source 11 is reflected at the reflector 12, converted into parallel rays of light at the parallel conversion lens 13, reflected at the mirror 14, and is then condensed by the condenser lens 15 to be incident on the input/output separating prism system 2.

Figure 4:
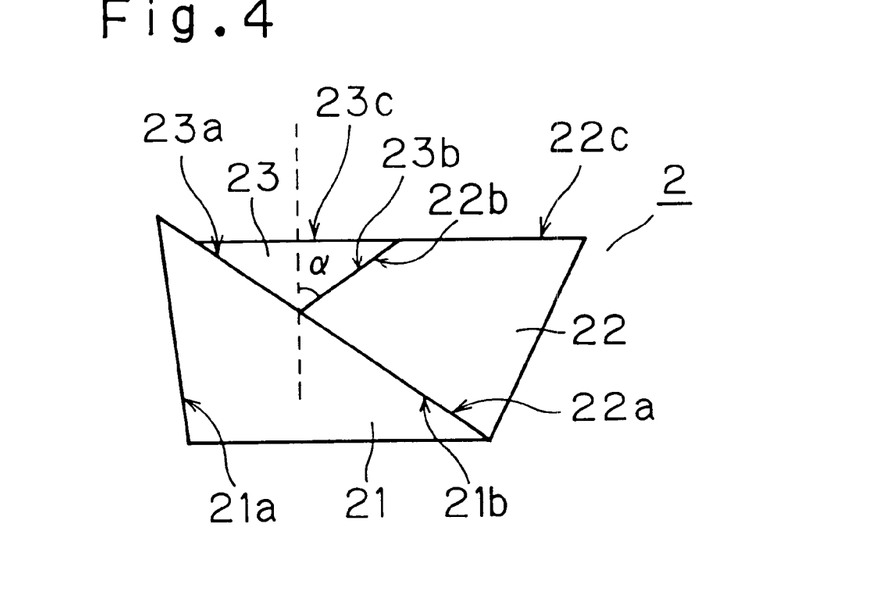
FIG. 4 is a detailed view of a prism system of the projector optical system according to the first embodiment.

FIG. 4 shows only the input/output separating prism system 2 of the projector optical system of FIG. 3. The input/output separating prism system 2 comprises three polyhedral prisms 21, 22 and 23. The square pole prism 22 is disposed so that a surface 22a thereof is opposed to a surface 21b of the triangular pole prism 21 with a thin air layer in between. The triangular pole prism 23 is disposed so that a surface 23a thereof is opposed to the surface 21b of the prism 21 with a thin air layer in between, and that a surface 23b thereof is opposed to a surface 22b of the prism 22 with a thin air layer in between. A surface 22c of the prism 22 and a surface 23c of the prism 23 form one plane. The surface 21b has an inclination so that the illuminating light incident from the surface 21a is totally reflected to be directed to the DMD 3 and the reflected light from the DMD 3 is transmitted.

Reverting to FIG. 3, the DMD 3 has a mirror surface in which an extremely large number of minute mirror devices (rectangular aluminum mirrors) are arranged on a substrate. The directions of reflection of the mirror devices constituting the mirror surface can be switched between two directions independently of one another. The switching of the directions of reflection is performed by ON and OFF control of video signals inputted to the DMD 3 with the mirror devices as pixels.

Of the reflected light from the mirror surface of the DMD 3, the ON light being reflected from mirror devices in the ON state is transmitted by the input/output separating prism system 2, and is then projected by the projection optical system 4 as signal light onto a screen in front. The projection optical system 4 comprises a plurality of lens elements (in FIG. 3, only the forefront and the rearmost lens elements 41 and 42 are shown).

As described above, this projector optical system uses only one DMD 3. When this optical system is used for projecting color images, a color wheel is provided in the illuminating optical system 1, and by driving the wheel, light rays of three colors red (R), green (G) and blue (B) are supplied to the DMD 3 in turn in chronological order. In this case, at the DMD 3, control is performed in correspondence with the video signal of each color.

Now, the reflected light from the mirror surface of the DMD 3 will be described. For ease of explanation, reflected light rays from, of the mirror devices constituting the mirror surface, the mirror devices at P11, P12, P13 and P14 are schematically shown in FIG. 3. For the reflected light ray from P1, both the ON light and the OFF light are shown, and for the reflected light rays from P12, P13 and P14, only the OFF light is shown.

The light from the illuminating optical system 1 is directed to the mirror surface of the DMD 3 by the optical path separating prism system 2 so that the light is incident on the mirror surface from a direction at a predetermined angle with respect to the optical axis Ax of the projection optical system 4.

The mirror devices constituting the mirror surface reflect the incident light substantially in the direction of the optical axis Ax of the projection optical system 4 when, of the video signals input to the DMD 3, the pixel signals corresponding to the mirror devices are ON. When the pixel signals are OFF, the mirror devices reflect the incident light in a predetermined direction with respect to the optical axis Ax.

When the OFF light is incident on the projection optical system 4, ghost is caused on the projection screen or the contrast is reduced. In this embodiment, in order that no OFF light is incident on the projection optical system 4, the surface 22b deflecting the optical path of a part the OFF light that could be incident on the projection optical system 4 is provided in the input/output prism system 2.

The surface 22b is formed so as to totally reflect the OFF light and transmit the ON light. Specifically, the surface 22b is formed so that the inclination α thereof (see FIG. 4) with respect to the optical axis Ax fulfills the condition (3a) and the condition (4a).

By this structure, the OFF light incident on the surface 22b (for example, the OFF light from P11 and P12) is reflected at the surface 22b to be discharged out of the effective optical path. It is unnecessary to deflect the OFF light not incident on the surface 22b (for example, the OFF light from P13 and P14) because it is outside the effective optical path from the first. The ON light incident on the surface 22b is transmitted. As described above, according to this embodiment, the OFF light can be prevented from being incident on the projection optical system 4 with a simple and small-size structure in which only the surface 22b is added to the input/output separating prism system 2. Consequently, high-contrast projection images without any ghost are obtained.

<Second Embodiment>

The projector optical system of a second embodiment is different from that of the first embodiment only in the structure of the input/output separating prism system 2.

Figure 5:
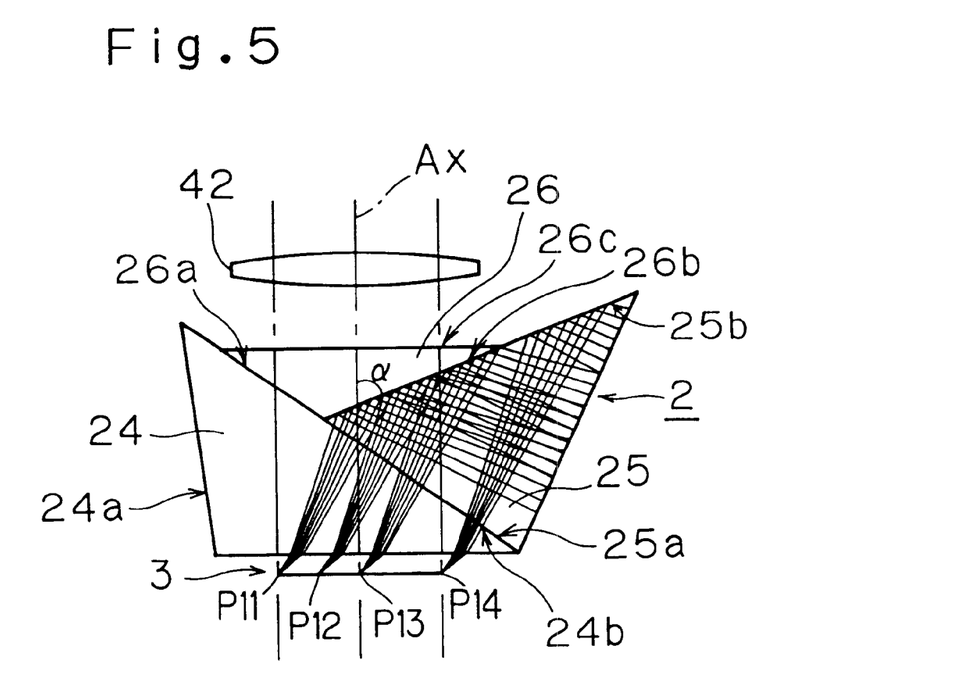
FIG. 5 is a cross-sectional view of a part of a projector optical system according to a second embodiment.

Therefore, only the different part will be described. FIG. 5 is a cross-sectional view of a part including the input/output separating prism system 2 of the projector optical system of this embodiment.

The input/output separating prism system 2 comprises three prisms 24, 25 and 26. The triangular pole prism 25 is disposed so that a surface 25a thereof is opposed to a surface 24b of the triangular pole prism 24 with a thin air layer in between. The triangular pole prism 26 is disposed so that a surface 26a thereof is opposed to the surface 24b of the prism 24 with a thin air layer in between, and that a surface 26b is opposed to a surface 25b of the prism 25 with a thin air layer in between.

The surface 24b has an inclination so that the illuminating light incident from the surface 24a is totally reflected to be directed to the DMD 3 and the reflected light from the DMD 3 is transmitted. The surface 25b is formed so as to totally reflect the OFF light and transmit the ON light. Specifically, the surface 25b is formed so that the inclination a thereof with respect to the optical axis Ax fulfills the condition (3a) and the condition (4a).

All the OFF light is once incident on the surface 25b of the prism 25, and the OFF light is reflected at the surface 25b by the above-described structure. The ON light incident on the surface 25b is transmitted by the surface 25b, and all the ON light is discharged out of the input/output separating prism system 2 from a surface 26c of the prism 26. Then, the ON light is made incident on the projection optical system 4.

In this embodiment, all the OFF light is reflected at the surface 25b in a direction completely different from the effective optical path. Therefore, the OFF light heading for the screen from a side of the projection optical system 4 is removed as well as the OFF light transmitted by the projection optical system 4, and very-high-contrast projection images without any ghost are obtained.

<Third Embodiment>

Figure 6A:
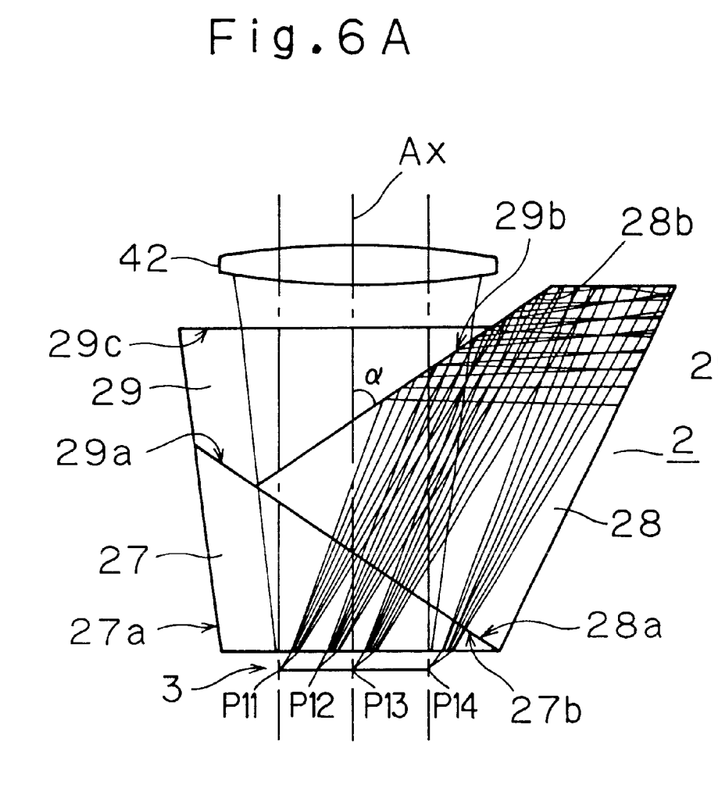
FIG. 6A is a cross-sectional view of a part of a projector optical system according to a third embodiment and shows the optical path of OFF light.

The projector optical system of a third embodiment is different from that of the first embodiment only in the structure of the input/output separating prism system 2. Therefore, only the different part will be described. FIG. 6A is a cross-sectional view of a part including the input/output separating prism system 2 of the projector optical system of this embodiment.

The input/output separating prism system 2 comprises three prisms 27, 28 and 29. The square pole prism 28 is disposed so that a surface 28a thereof is opposed to a surface 27b of the triangular pole prism 27 with a thin air layer in between. The square pole prism 29 is disposed so that a surface 29a thereof is opposed to the surface 27b of the prism 27 with a thin air layer in between, and that a surface 29b thereof is opposed to a surface 28b of the prism 28 with a thin air layer in between.

The surface 27b has an inclination so that the illuminating light incident from a surface 27a is totally reflected to be directed to the DMD 3 and the reflected light from the DMD 3 is transmitted. The surface 28b is formed so as to totally reflect the OFF light and transmit the ON light. Specifically, the surface 28b is formed so that the inclination a thereof with respect to the optical axis Ax fulfills the condition (3a) and the condition (4a). Further, the surface 28b is formed so as to have the inclination a rather close to the lower limit defined by the condition (4a).

By this structure, at the surface 28b, not only the OFF light is reflected but also scattered light of the ON light is reflected to be completely discharged out of the effective optical path. The scattered light of the ON light is light reflected from the mirror devices in the ON state in FIG. 2 with an angle of reflection larger than $\theta_{1a}$. The scattered light is caused because of a structural problem of the DMD 3. For example, light getting into gaps of several microns between the mirror devices of the DMD 3 or light incident on depressions within the mirror devices becomes the scattered light. It is impossible to form the reflecting surfaces of the mirror devices so as to be completely flat, and there are cases where a depression is formed in the center.

Figure 6B:
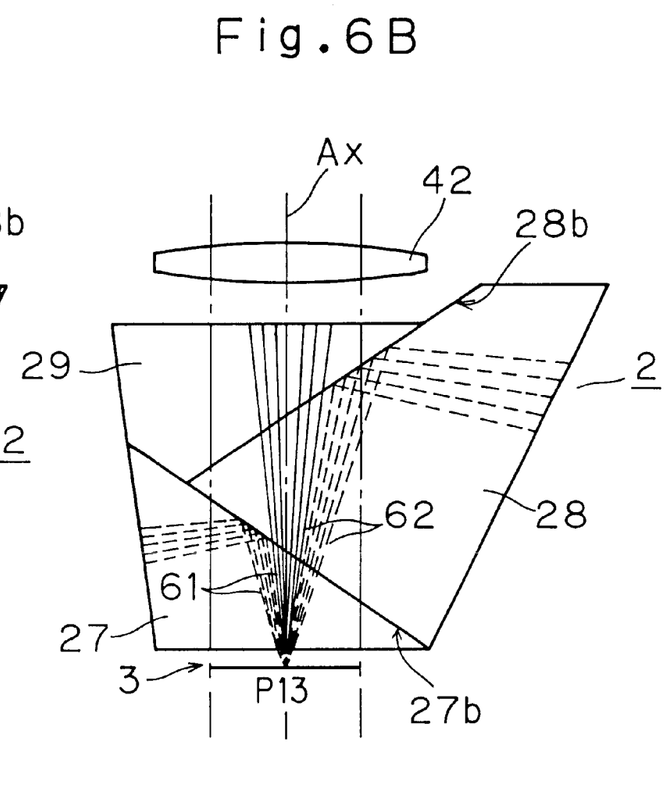
FIG. 6B is a cross-sectional view of the part of the projector optical system according to the third embodiment and shows the optical path of scattered light.

FIG. 6B shows the optical path of the scattered light of the ON light. In FIG. 6B, only the ON light reflected at P13 is shown. The scattered light 62 caused on the side near the OFF light is totally reflected at the surface 28b to be discharged out of the effective optical path. The scattered light 61 caused on the opposite side of the optical axis Ax to the scattered light 62 is reflected at the surface 27b.

In this embodiment, the OFF light is completely removed from the effective optical path and the scattered light of the ON light is also removed from the effective optical path. Consequently, projection images with clear edges are obtained. It is needless to say that high-contrast projection images without any ghost are obtained.

According to the present invention, the OFF light can be prevented from being incident on the projection optical system. Consequently, high-contrast projection images without any ghost are obtained. In addition, since the above-mentioned effect is obtained with a simple structure in which only one surface is added to the prism, increase in the size of the optical system and the cost never result.

Further, by adding a contrivance to the angle of the added surface, the scattered light can be prevented from being incident on the projection optical system. By this structure, higher-contrast projection images can be obtained.

Obviously, many modifications and variations of the present invention are possible in light of the above teachings. It is therefore to be understood that within the scope of the appended claims, the invention may be practiced other than as specifically described.

What is claimed is:

1. An optical apparatus comprising:
   a reflective type spatial light modulator including a plurality of reflective pixels, each of the pixels separating incident light by reflecting the incident light in a first direction to provide a first reflected light when the pixel is in a first state and a second direction to provide a second reflected light when the pixel is in a second state;
   an optical function surface positioned to directly receive the first and second reflected light from the reflective type spatial light modulator, the optical function surface reflecting the first reflected light and transmitting the second reflected light; and
   an optical system for transmitting the second reflected light.

2. An optical apparatus as claimed in claim 1, wherein said optical system is a projection optical system.

3. An optical apparatus as claimed in claim 1, wherein said modulator is a digital micromirror device and the pixels are minute variable light reflection angle mirrors.

4. An optical apparatus as claimed in claim 1, wherein said optical function surface is a surface of a prism.

5. An optical apparatus as claimed in claim 4, wherein said prism is a compound prism comprising a plurality of polyhedral prisms, and fulfills the following conditions:

$$\pi/2 - \sin^{-1}(1/n_e) + \sin^{-1}(1/2n_e F_{No}) < \alpha$$

$$\alpha \leq \pi/2 - \sin^{-1}(1/n_e) + \sin^{-1}[(1/n_e)\sin\{4x - \sin^{-1}(1/2F_{No})\}]$$

where
- α represents an angle of said optical function surface to an optical axis of said optical system,
- $F_{No}$ represents an F number of said optical system,
- 4x represents an angle between the first direction and the second direction, and
- $n_e$ represents an refractive index of a medium of said prism to an extraordinary ray.

6. An optical apparatus as claimed in claim 4, wherein said prism directs the incident light to the reflective type spatial light modulator and directs the first reflected light and second reflected light in different directions from the incident light.

7. A projector comprising:
   a light source;
   an illuminating optical system from which light from said light source exits as illuminating light;
   a reflective type spatial light modulator having a plurality of pixels, each pixel reflecting the illuminating light from said illuminating optical system and separating the illuminating light into ON light when the pixel is in a first state and OFF light when the pixel is in a second state, the ON light and the OFF light being directed in directions different from each other;
   a prism having an optical function surface positioned to directly receive the first and second reflected light from the reflective type spatial light modulator, the optical function surface transmitting the ON light and reflecting the OFF light; and
   a projection optical system for projecting the ON light exiting from said optical function surface.

8. A projector as claimed in claim 7, wherein said modulator is a digital micromirror device and the pixels comprise minute variable light reflection angle mirrors.

9. A projector as claimed in claim 7, wherein the OFF light is incident upon said optical function surface at an angle greater than an angle of reflection of said optical surface and the ON light is incident upon said optical function surface at an angle less than the angle of reflection of said optical surface.

10. A projector as claimed in claim 7, wherein said prism is a compound prism comprising a plurality of polyhedral prisms, and fulfills the following conditions:

$$\pi/2 - \sin^{-1}(1/n_e) + \sin^{-1}(1/2n_e F_{No}) < \alpha$$
$$\alpha \leq \pi/2 - \sin^{-1}(1/n_e) + \sin^{-1}[(1/n_e)\sin\{4x - \sin^{-1}(1/2F_{No})\}]$$

where
- α represents an angle of said optical function surface to an optical axis of said projection optical system,
- $F_{No}$ represents an F number of said projection optical system,
- 4x represents an angle between directions of the ON light and the OFF light reflected from said modulator, and
- $n_e$ represents an refractive index of a medium of said prism to an extraordinary ray.

11. A projector as claimed in claim 7, wherein said prism directs the illuminating light to said modulator and directs the ON light and the OFF light reflected from said modulator in different directions from a direction of the illuminating light.

12. A projector as claimed in claim 7, wherein said illuminating optical system has a color wheel and the illuminating light is temporally color-separated by use of the color wheel.

13. An optical apparatus comprising:
   a reflective type spatial light modulator including a plurality of reflective pixels, each of the pixels separating incident light by reflecting the incident light in a first direction to provide a first reflected light when the pixel is in a first state and a second direction to provide a second reflected light when the pixel is in a second state,
   an optical function surface positioned to directly receive the first and second reflected light from the reflective type spatial light modulator, the optical function surface reflecting all of the first reflected light and transmitting the second reflected light; and
   an optical system for transmitting the second reflected light.

* * * * *